(12) United States Patent
Ramirez et al.

(10) Patent No.: US 11,553,723 B2
(45) Date of Patent: Jan. 17, 2023

(54) COLOR INDICATING FORMULATIONS

(71) Applicant: WM. WRIGLEY JR. COMPANY, Chicago, IL (US)

(72) Inventors: Lilian Ramirez, Chicago, IL (US); Penny Martin, Chicago, IL (US); Minmin Tian, Chicago, IL (US)

(73) Assignee: WM. WRIGLEY JR. COMPANY ( * ) Notice: Subject to any disclaimer, the term of this patent is extended or adjusted under 35 U.S.C. 154(b) by 639 days.

(21) Appl. No.: 16/061,090

(22) PCT Filed: Dec. 12, 2016

(86) PCT No.: PCT/US2016/066206
§ 371 (c)(1),
(2) Date: Jun. 11, 2018

(87) PCT Pub. No.: WO2017/100784
PCT Pub. Date: Jun. 15, 2017

(65) Prior Publication Data
US 2018/0360068 A1 Dec. 20, 2018

Related U.S. Application Data

(60) Provisional application No. 62/266,503, filed on Dec. 11, 2015.

(51) Int. Cl.
A23G 4/06 (2006.01)
A23G 4/12 (2006.01)

(52) U.S. Cl.
CPC ............... A23G 4/064 (2013.01); A23G 4/06 (2013.01); A23G 4/068 (2013.01); A23G 4/12 (2013.01); A23V 2002/00 (2013.01); A23V 2200/044 (2013.01); A23V 2200/312 (2013.01)

(58) Field of Classification Search
CPC .................................. A23G 4/06; A23G 4/12
See application file for complete search history.

(56) References Cited

U.S. PATENT DOCUMENTS

| 2,190,180 | A | | 2/1940 | Barker | |
|---|---|---|---|---|---|
| 5,154,927 | A | * | 10/1992 | Song | A23G 4/02 424/440 |
| 2006/0182693 | A1 | | 8/2006 | Kristiansen et al. | |
| 2006/0275222 | A1 | | 12/2006 | James Dodds et al. | |
| 2006/0280835 | A1 | * | 12/2006 | Jani | A23G 4/068 426/3 |

(Continued)

FOREIGN PATENT DOCUMENTS

FR  2151780 A6  4/1973
JP  H02308759 A  12/1990

(Continued)

OTHER PUBLICATIONS

International Food Information Council Foundation and FDA, "Food ingredients and colors". Available online as of Apr. 2010, pp. 1-8. (Year: 2010).*

Primary Examiner — Jenna A Watts

(57) ABSTRACT

Color indicating chewing gum compositions comprising one or more color compounds are provided. The compositions demonstrate a visual color or shade change from start of chewing to the end of chewing and provide oral health benefits. Methods of producing a color changing chewing gum are also provided.

14 Claims, 6 Drawing Sheets

(56) References Cited

U.S. PATENT DOCUMENTS

| | | |
|---|---|---|
| 2010/0104689 A1 | 4/2010 | Thorengaard et al. |
| 2010/0255064 A1* | 10/2010 | Andersen .................. A23G 4/20 424/440 |
| 2012/0253232 A1 | 10/2012 | Minakuchi et al. |
| 2012/0258053 A1 | 10/2012 | Patel et al. |

FOREIGN PATENT DOCUMENTS

| | | |
|---|---|---|
| JP | 2000083593 A | 3/2000 |
| NO | 2013061583 A1 | 5/2013 |
| RU | 2141217 C1 | 11/1999 |
| WO | 9629047 A1 | 9/1996 |
| WO | 2000035298 A1 | 6/2000 |
| WO | 0114875 A1 | 3/2001 |
| WO | 2002087352 A1 | 11/2002 |
| WO | 2007076857 A1 | 7/2007 |
| WO | 2011117638 A2 | 9/2011 |
| WO | 2015138319 A1 | 9/2015 |

* cited by examiner

Blue → White

Green → Yellow

COLOR INDICATING FORMULATIONS

CROSS-REFERENCE TO RELATED APPLICATION

This application claims priority to U.S. Provisional Application No. 62/266,503, filed on Dec. 11, 2015, which is incorporated by reference herein in its entirety.

FIELD

The presently disclosed subject matter relates to color indicating formulations, particularly for use in oral products. Specifically, the present disclosure is directed to color indicating formulations for use in chewing gum and methods of producing color changing chewing gum.

BACKGROUND

Various chewing gums that change color during mastication have been proposed in the art. However, these chewing gums tend to depend on ingredients that are pH-sensitive, e.g., colorants that change color with a change in pH. Such chewing gums depend on the pH of saliva to initialize the change in color. Color changing chewing gums were also limited in color possibilities for both pre-chew and post-chew colors. Further, such chewing gums often changed color over very short time-spans, for example, five minutes or less.

The physical act of chewing increases the flow of saliva in the mouth. Chewing after eating increases salivary flow, which can increase oral hygiene. Benefits of increased salivary flow include, but are not limited to 1) removing food debris, 2) neutralizing and washing away the acids that are produced when food is broken down by the bacteria within dental plaque, 3) carrying more calcium and phosphate to help strengthen and remineralize tooth enamel, and 4) reducing oral dryness. Clinical studies have shown that chewing sugarless gum for 20 minutes following meals can help prevent tooth decay. When brushing teeth is not a suitable option, chewing sugarless gum is a great way to help keep teeth clean and healthy after eating or drinking.

Chewing gum is also an effective booster of cognitive performance, including but not limited to mood enhancement, concentration, memory, and alertness—and without side effects.

Chewing gum that delivers a variety of therapeutic agents could provide additional benefits to those gums currently being offered by the ability to mechanically stimulate saliva flow. For instance, some gum might contain active agents that could enhance the gum's ability to remineralize teeth and reduce decay, or enable gum to help reduce plaque and gingivitis. Chewing gum is often also used as a delivery system for active ingredients, such a teeth whiteners and pharmaceuticals. Upon chewing, such active ingredients are solubilized by saliva and delivered to the subject. However, different active ingredients require different chewing times to deliver the necessary amount of active ingredient. Additionally, to achieve the benefits of increased salivary flow and boost cognitive performance, the gum must be chewed for a specific amount of time. Therefore, there remains a need for chewing gums that indicate to a consumer when a chewing gum has been sufficiently masticated to provide benefits to the consumer.

The presently disclosed subject matter addresses this need as discussed in detail below.

SUMMARY OF THE INVENTION

The presently disclosed subject matter is directed to chewing gum compositions comprising at least one water soluble color compound and optionally at least one water insoluble color compound, where the at least one water soluble compound leaches out of the chewing gum after from about 5 minutes to about 20 minutes of chewing.

In certain embodiments, the at least one water soluble color compound is selected from the group consisting of any water soluble dye, FD&C Blue 1 dye, FD&C Blue 2 dye, liquid caramel (regular or low 4 MEI), FD&C Red 40, FD&C Red 3, FD&C Yellow 5, FD&C Yellow 6, FD&C Green 3, fruit and vegetable based colorants (anthocyanins, betanin), spirulina, gardenia, and combinations thereof.

In certain embodiments, the at least one water insoluble color compound is selected from the group consisting of any pigment, lake pigment, titanium dioxide, curcumin, iron oxides, FD&C Blue 1 lake, any FD&C food grade lake or oil soluble dye, beta carotene, other carotenoids, Beta Apo 8' Carotenal, canthaxanthin, chlorophylls, and combinations thereof.

In certain embodiments, the chewing gum further comprises an active ingredient. In certain embodiments, the active ingredient is a dental active agent.

In certain embodiments, the dental active agent is selected from the group consisting of sodium tripolyphosphate, sodium pyrophosphate (SPP), sodium hexametaphosphate, sodium bicarbonate, urea, lauroyl arginine ethyl ether (LAE), allyl isothiocyanate, zinc lactate, zinc gluconate, tea polyphenols, pigallocatechin gallate (EGCG), cranberry extract, cocoa flavanoids, magnolia bark extract, and combinations thereof.

In certain embodiments, the active ingredient leaches out of the chewing gum in equal or fewer minutes as the at least one water soluble compound leaches out of the chewing gum.

In certain embodiments, the chewing gum composition has at least about 1% color change that occurs after about 5 minutes of chewing. In other embodiments, the chewing gum composition has at least about 5% color change that occurs after about 10 minutes of chewing.

Another aspect of the presently disclosed subject matter provides a method of producing a color changing chewing gum comprising the steps of admixing a gum base portion, a bulk portion, and a flavor, where at least one color compound is admixed directly with the gum base portion, the bulk portion, or with both the gum base portion and the bulk portion.

In certain aspects, the presently disclosed subject matter provides a method of producing a color changing chewing gum where at least one color compound is a water soluble color compound that is admixed directly with both the bulk portion and the gum base portion. In alternative aspects, the presently disclosed subject matter provides a method of producing a color changing chewing gum where at least one color compound is a water insoluble color compound that is admixed directly with both the bulk portion and the gum base portion. In other embodiments, the presently disclosed subject matter provides a method of producing a color changing chewing gum where at least one color compound is an oil soluble color compound that is admixed directly with both the bulk portion and the gum base portion.

In certain aspects, the method of producing a color changing chewing gum produces a gum containing from about 0.05% to about 5.0% by weight of a water soluble color compound. In other aspects, the method produces a color changing chewing gum containing from about 0.004% to about 5.0% by weight of a water insoluble color compound. In alternative aspects, the method of producing a color changing chewing gum produces a gum containing from about 0.05% to about 5.0% by weight of a water soluble color compound, and from about 0.004% to about 5.0% by weight of a water insoluble color compound. In another aspect, the method of producing a color changing chewing gum produces a gum containing from 0.004% to about 0.01% by weight of an oil soluble color compound. In certain aspects, the method of producing a color changing chewing gum produces a gum containing from about 0.001% to about 5.0% by weight of a color compound selected from lakes, pigments, and combinations thereof.

The foregoing has outlined broadly the features and technical advantages of the present disclosure in order that the detailed description that follows can be better understood. Additional features and advantages of the disclosure will be described hereinafter which form the subject of the claims of the disclosure. It should be appreciated by those skilled in the art that the conception and specific embodiment disclosed can be readily utilized as a basis for modifying or designing other structures for carrying out the same purposes of the present disclosure. It should also be realized by those skilled in the art that such equivalent constructions do not depart from the spirit and scope of the application as set forth in the appended claims. The novel features which are believed to be characteristic of the application, both as to its organization and method of operation, together with further objects and advantages will be better understood from the following description.

DETAILED DESCRIPTION

Figure 1A:
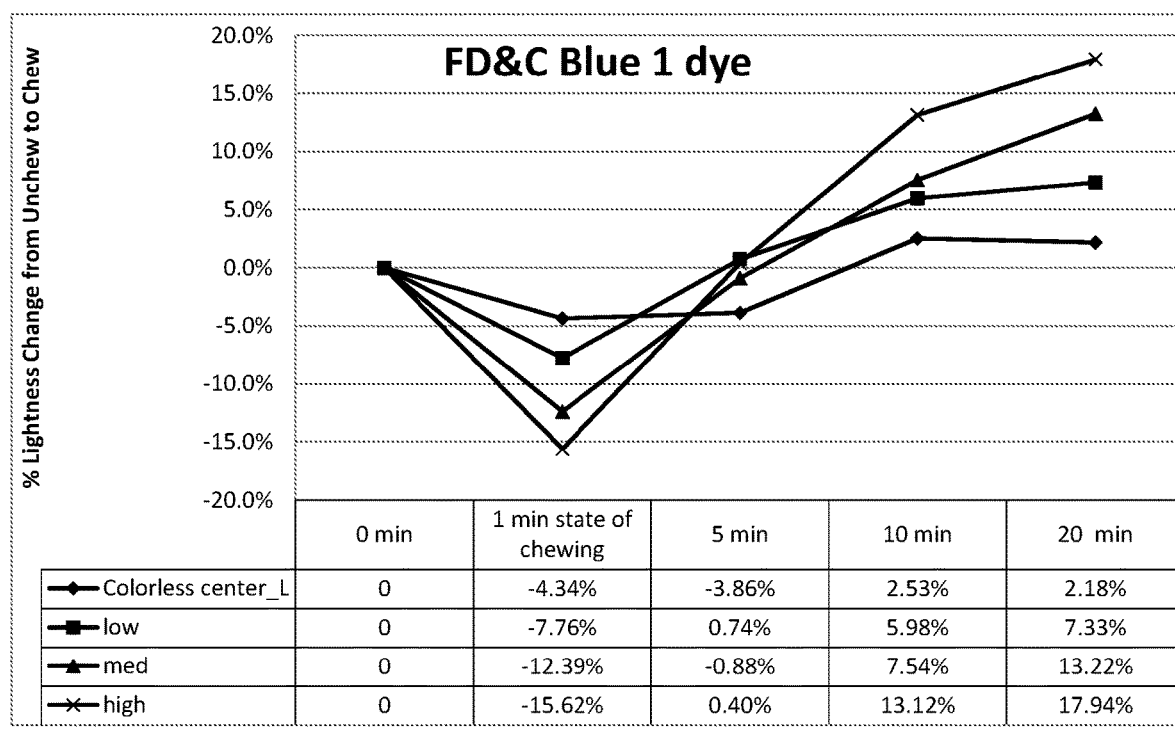
FIGS. 1a-1c display the change in lightness (y-axis) of a chewing gum over time (x-axis). Each chewing gum contained a different water soluble color compound and was evaluated at T=0 minutes, 1 minute, 5 minutes, 10 minutes, and 20 minutes of chewing.

As noted above, there remains a need in the art for color changing chewing gum formulations and methods for improving oral health or delivering an active ingredient via chewing gum. The presently disclosed subject matter addresses this need through the use of one or more color compounds that provide color-indicating features to indicate that the chewing gum has been masticated for a length of time sufficient to increase oral health, deliver an active ingredient, or provide other benefits to the consumer.

1. Definitions

The terms used in this specification generally have their ordinary meanings in the art, within the context of this disclosed subject matter and in the specific context where each term is used. Certain terms are discussed below, or elsewhere in the specification, to provide additional guidance to the practitioner in describing the compositions and methods of the disclosed subject matter and how to make and use them.

As used herein, the use of the word "a" or "an" when used in conjunction with the term "comprising" in the claims and/or the specification can mean "one," but it is also consistent with the meaning of "one or more," "at least one," and "one or more than one." Still further, the terms "having," "including," "containing" and "comprising" are interchangeable and one of skill in the art is cognizant that these terms are open ended terms.

The term "about" or "approximately" means within an acceptable error range for the particular value as determined by one of ordinary skill in the art, which will depend in part on how the value is measured or determined, i.e., the limitations of the measurement system. For example, "about" can mean within 3 or more than 3 standard deviations, per the practice in the art. Alternatively, "about" can mean a range of up to 20%, preferably up to 10%, more preferably up to 5%, and more preferably still up to 1% of a given value.

As used herein, "admixing" refers to the process where the coloring formulation is mixed with or added to the completed product, or mixed with some or all of the components of the product during product formation, or some combination of these steps. When used in the context of admixing, the term "product" refers to the product or any of its components. This admixing step can include a process selected from the step of adding the coloring formulation to the product, spraying the coloring formulation on the product, coating the coloring formulation on the product, suspending the coloring formulation in the product, painting the coloring formulation on the product, pasting the coloring formulation on the product, encapsulating the product with the coloring formulation, mixing the coloring formulation with the product, and any combination thereof. The coloring formulation can be a liquid, dry powder, spray, paste, suspension, and any combination thereof.

As used herein, the term "chewing gum" or "gum" refers to a flavored substance intended for chewing. The term as used herein also includes bubble gum and confectionery products containing chewing gum. In certain embodiments, chewing gum forms include, but are not limited to, tablets, sticks, solid balls, hollow balls, cut and wrap, and pellets or pillows. Unless otherwise specified, all percentages used herein are weight percents. As used herein, chewing gum contains a water insoluble gum base portion and a water soluble bulk portion.

As used herein, the term "breath freshening agent" means compounds or compositions that counteract malodor. Breath freshening agents include, but are not limited to, salts of zinc, salts of copper, polyphenols, mushroom extracts, and mixtures thereof.

As used herein, the term "mouth odor masking flavor" means compounds or compositions that cover, mask, or overpower malodor. Mouth odor masking flavors include, but are not limited to, cinnamon, mint, wintergreen, fruit flavors, and mixtures thereof.

As used herein, the term "dental active agent" means compounds or compositions which promote oral health or deliver active ingredients to the teeth. Dental active agents include, but are not limited to, tooth whiteners, fluoride, stain removers, calcium salts, phosphate salts, and mixtures thereof.

As used herein, the term "shade," as in a color compounds which changes "shade," visually means that the color becomes lighter or changes color (for example, green to yellow or blue to light blue) in appearance over a period of time.

2. Color Compounds

The present application relates to color indicating formulations that include at least one, two, three, or more color compounds. In certain embodiments, the color compounds are water soluble. In certain embodiments, the color compounds are water insoluble. In certain embodiments, the color compounds are dyes. In further embodiments, the dyes are water soluble or oil soluble. In certain embodiments, the dyes can be incorporated into an oral care product which visibly changes color or shade during chewing. In certain embodiments, the color compounds are a mixture of one or more water soluble colorants and/or one or more water insoluble colorants.

Color compounds can include, but are not limited to, food grade dyes and lakes (such as FD&C dyes and FD&C lake colorants), fruit and vegetable juices/extracts (such as anthocyanins or betalains and other water soluble dyes derived from natural or non-natural sources), titanium dioxide, beta carotene, and other carotenoids, Beta Apo 8' Carotenal, curcumin, iron oxides, carmine, carminic acid, chlorophylls, and combinations thereof.

In certain embodiments, the color compounds are water soluble dyes. Water soluble dyes include, but are not limited to, FD&C Blue 1, FD&C Blue 2, FD&C Yellow 5, FD&C Yellow 6, FD&C Red 40, FD&C Red 3, liquid caramel (regular or low 4 MEI), FD&C Green 3, fruit and vegetable and plant based colorants (anthocyanins, betanin), spirulina, gardenia, carthamus and combinations thereof.

In certain embodiments, the color compounds are water insoluble. Water insoluble color compounds include, but are not limited to, beta carotene and other carotenoids, paprika oleoresin and extract, FD&C Blue 1 lake (brilliant blue lake), and all FD&C or synthetic food grade lakes or oil soluble dyes, additional lake pigments, Beta Apo 8' Carotenal, titanium dioxide, curcumin, iron oxides, and combinations thereof.

In certain embodiments, the color compounds are oil soluble. Oil soluble dyes include, but are not limited to, beta carotene, Beta Apo 8' Carotenal, paprika oleoresin, canthaxanthin, and combinations thereof.

In other embodiments, the color compounds are FD&C or non-FD&C colors. In further embodiments, the color compounds can be in liquid or powder form.

In certain embodiments, the color compounds can be incorporated into chewing gum formulations.

3. Chewing Gum Formulations

The presently disclosed subject matter can be incorporated into chewing gum using conventional procedures and equipment and suitable additional components known in the art, for example, as described by U.S. Publication Nos. 2013/0156885 and U.S. 2005/0202118, each of which is incorporated by reference in its entirety herein. A chewing gum composition can contain a chewable gum base portion, which is essentially free of water and is water insoluble; a water soluble bulk portion; and flavors, which can be water insoluble. The water soluble bulk portion can dissipate with a portion of the flavor over a period of time during chewing. The water insoluble gum base portion is retained in the mouth throughout the chew.

In certain embodiments, color compounds can be admixed and added to the water soluble bulk portion. In other embodiments, color compounds can be admixed and added to the water insoluble gum base portion. In another embodiment, the color compounds can be admixed with both the water soluble bulk portion and water insoluble gum base portion. Without being bound to any particular theory, Applicant believes that oil soluble color compounds and pigments have an affinity for the water insoluble gum base portion, and the water soluble color compounds in the water soluble bulk portion, or dispersed throughout the whole formulation, have an affinity for saliva upon chewing, which enables the chewing gum to change colors.

In certain embodiments, the insoluble gum base comprises elastomers, elastomer solvents, plasticizers, waxes, emulsifiers, and/or inorganic fillers. In certain embodiments, the insoluble gum base can comprise elastomers, elastomer solvents, plasticizers, waxes, emulsifiers and/or inorganic fillers. Plastic polymers, such as polyvinyl acetate, which can behave as plasticizers, can also be included. In certain embodiments, plastic polymers can include, but are not limited to, polyvinyl laureate, polyvinyl alcohol, and polyvinyl pyrrolidone. Non-limiting examples of elastomers can include polyisobutylene, butyl rubber, (isobutylene-isoprene copolymer), and styrene butadiene rubber, as well as natural masticating substances such as chicle, etc. In certain embodiments, elastomer solvents can include resins such as terpene resins. In certain embodiments, the plasticizers are fats and oils, including, but not limited to, tallow, hydrogenated and partially hydrogenated vegetable oils, and cocoa butter. In certain embodiments, the waxes include, but are not limited to, paraffin, microcrystalline, and natural waxes, such as beeswax and carnauba.

In certain embodiments, the chewing gum further contains one or more flavor components that are derived from artificial, or natural sources, or combinations thereof. In certain embodiments, the chewing gum can contain sugar or can be sugar-free. In certain embodiments, the chewing gum can comprise high potency sweeteners including, but not limited to, synthetic substances, saccharin, thaumatin, alitame, saccharin salts, aspartame, sucralose, stevia, and acesulfame.

In certain embodiments, the water insoluble gum base constitutes from about 5% to about 95% by weight of the chewing gum. In certain embodiments, the water insoluble gum base comprises from about 10% to about 50% by weight of the chewing gum, or from about 20% to about 35% by weight of the chewing gum.

In certain embodiments, the high potency sweetener can comprise from about 0.02% to about 1.0% by weight of the chewing gum, or from about 0.05% to about 0.5% by weight of the chewing gum.

In certain embodiments, the chewing gum has a neutral pH, e.g., from about 5.9 to about 8.0.

In certain embodiments, the chewing gum formation process can include modification of one or more ingredients by encapsulation. In certain embodiments, encapsulation modifies the release of, for example, cooling compounds, from the chewing gum by modifying the solubility or dissolution rate. Any standard technique which gives partial or full encapsulation of the combination of natural cooling agents can be used. In certain embodiments of the presently disclosed subject matter, encapsulation techniques include, but are not limited to, spray drying, spray chilling, fluid-bed coating, and coacervation. In certain embodiments, encapsulation techniques that give partial encapsulation or full encapsulation can be used.

In certain embodiments, suitable encapsulating materials can include, but are not limited to, water soluble sugar or sugar alcohol such as sorbitol, isomalt, dextrose, erythritol, lactitol, maltitol, mannitol, xylitol, hydrogenated corn syrup, and mixtures thereof. In certain embodiments, encapsulating materials can also include water soluble starch, modified starch, hydroxyl methyl cellulose, hydroxypropyl methylcellulose (HPMC), sodium alginate, alpha, beta and gamma cyclodextrin, polymers, and combinations thereof. In certain embodiments, the coating compositions can be susceptible to water permeation to various degrees. In certain embodiments, the coating composition is a food grade material.

The chewing gum can include one or more of the following: anti-microbial agents; anti-plaque agents; physiological cooling agents; breath freshening agents; breath freshening and mouth odor masking flavors; dental active agents; and combinations thereof.

Dental active agents include, but are not limited to, tooth whiteners, fluoride, stain removers, stain preventing actives, anti-inflammation compounds, anti-cavity compounds, calcium salts, phosphate salts, and mixtures thereof.

In certain embodiments, tooth whiteners include, but are not limited to, sodium tripolyphosphate (STPP or STP), sodium pyrophosphate (SPP), sodium hexametaphosphate, sodium bicarbonate, urea, lauroyl arginine ethyl ether (LAE), and combinations thereof. In certain embodiments, STPP, STP, sodium hexametaphosphate, sodium bicarbonate, or urea is present in the gum composition in an amount of about 0.01% to about 10% by weight. In certain embodiments, LAE is present in the gum composition in an amount of about 0.01% to about 5% by weight.

Anti-microbial and anti-plaque agents include, but are not limited to, cardamom oil, magnolia bark extract (MBE), cranberry, geraniol, cinnamaldehyde, peppermint, triclosan, chlorhexidine, cetyl pyridinium chloride (CPC), LAE, and mixtures thereof. In certain embodiments, magnolia bark extract is present in the gum composition in an amount of from about 0.01% to about 5% by weight. In certain embodiments, LAE is present in the gum composition in an amount of from about 0.01% to about 5% by weight.

Physiological cooling agents include menthol N-2,3-trimethyl-2-isopropyl butanamide, 3-1-menthoxypropane-1,2-diol, N-ethyl-p-menthane-3-carboxamide, menthane ketals, menthyl succinate, isopulegol, menthyl glutarate, and mixtures thereof.

Breath freshening agents include, but are not limited to, salts of zinc, salts of copper, polyphenols, mushroom extracts, allyl isothiocyanate (AITC), zinc lactate, zinc gluconate, magnolia bark extract, other antibacterial agents that kill germ causing bad breath, or mixtures thereof. In certain embodiments, AITC is present in the gum composition in an amount of from about 0.01% to about 1% by weight. In certain embodiments, zinc lactate is present in the gum composition in an amount of from about 0.01% to about 5% by weight. In certain embodiments, zinc gluconate is present in the gum composition in an amount of from about 0.01% to about 5% by weight.

Breath freshening and mouth odor masking flavors include, but are not limited to, cinnamon, mint, wintergreen, fruit flavors, and mixtures thereof.

Anti-inflammation compounds include, but are not limited to, MBE, tea polyphenols, pigallocatechin gallate (EGCG), cranberry extract, cocoa flavanoids, and combinations thereof.

In certain embodiments, the chewing gum formulation can include one or more color compounds.

4. Color Indicating Chewing Gum

The present application relates to color indicator formulations that include at least one, two, three, or more color compounds. The formulations can be incorporated into chewing gum formulations as discussed above.

In certain embodiments, water soluble color compounds can be admixed directly or added to the water soluble portion bulk portion. In other embodiments, water insoluble or oil soluble color compounds can be admixed directly or added to the water insoluble gum base portion. In other embodiments, color compounds can be admixed directly, added, and/or incorporated into the water soluble bulk portion, the water insoluble gum base portion, or both the water soluble bulk portion and water insoluble gum base portion.

In certain embodiments, mastication causes the one or more water soluble color compounds to leach into the saliva, changing the visual color of the gum. This can occur after from about 5 minutes to about 20 minutes of chewing. In some embodiments, the gum becomes whiter in color as chewing proceeds. In other embodiments, oil soluble color is incorporated into the water insoluble base portion. Alternatively, the oil soluble compound, lake, or pigment is incorporated into both the water insoluble gum base portion and the water soluble bulk portion of the chewing gum. The oil soluble compounds can stay within the chewing gum matrix during chewing. As the one or more water soluble color compounds leach into the saliva, the gum visually alters to appear as the color of the oil soluble or water insoluble color compound, thus indicating to the consumer that the gum has been sufficiently masticated to provide benefits. Alternatively, the gum visually alters to appear a different shade of the original color, e.g., lighter, or alters from one color to another, e.g., green to yellow.

In certain embodiments, the water soluble color compound admixed with the water soluble bulk portion is blue in color, e.g., FD&C Blue 1, FD&C Blue 2, or combinations thereof. Upon chewing, as the water soluble color compound leaches into the saliva, the gum can turn from colored (for example, blue) to uncolored or off-white/white. In other embodiments, as the water soluble color compound leaches into the saliva, the gum can turn from colored (for example, blue) to a different shade of the color (for example, light blue).

In certain embodiments, the water soluble color compound admixed with the water soluble bulk portion is blue in color, and the water insoluble or oil soluble color compound admixed with the water insoluble gum base portion is yellow in color, e.g., beta carotene. The unchewed gum therefore can appear green in color. Upon chewing, the gum can turn from green to yellow as the water soluble color compound leaches into the saliva.

In certain embodiments, the visual color change of the gum occurs independently of the pH of saliva.

In certain embodiments, the color compound levels present within the gum are set within a good manufacturing practice ("GMP") standard, or within color regulation limits. In certain embodiments, the water soluble or oil soluble color compound can be present within the gum in an amount of from about 0.0001% to about 6.0% by weight, or from about 0.05% to about 5.0% by weight. In certain embodiments, the water soluble or oil soluble color compound is a dye and can be present within the gum in an amount of from about 0.001% to about 0.2% by weight. In other embodiments, the color compound is a water insoluble pigment or lake, such as FD&C Blue 1 lake, and can be present within the gum in an amount of from about 0.001% to about 2.0% by weight, or from about 0.004% to about 0.3% by weight.

In other embodiments, the color changing chewing gum contains from about 0.05% to about 5.0% by weight of a water soluble color compound, and from about 0.004% to about 5.0% by weight of a water insoluble color compound. In certain embodiments, the color changing chewing gum contains from about 0.004% to about 5.0% by weight of an oil soluble, or from about 0.004% to about 0.01% by weight of an oil soluble color compound. In another embodiment, a lake, pigment, and/or combination thereof is present within the gum from about 0.001% to about 5.0% by weight, or from about 0.05% to about 2.0% by weight.

In certain embodiments, FD&C Blue 1 dye can be present within the gum in an amount of from about 0.001% to about 0.5% by weight. In certain embodiments, FD&C Blue 1 dye can be present within the gum in an amount of about 0.014% or about 0.066% by weight.

In certain embodiments, FD&C Blue 2 dye can be present within the gum in an amount of from about 0.001% to about 5.0% by weight. In certain embodiments, FD&C Blue 2 dye can be present within the gum in an amount of about 0.024% or about 0.1% by weight.

In certain embodiments, beta carotene can be present within the gum in an amount of from about 0.0001% to about 5.0% by weight. In certain embodiments, beta carotene can be present within the gum in an amount of about 0.0012% by weight. In some embodiments, the beta carotene present within the gum is from spirulina.

In certain embodiments, spirulina can be present within the gum in an amount of from about 0.0001% to about 5.0% by weight. In certain embodiments, spirulina can be present within the gum in an amount of about 1.0% by weight.

In certain non-limiting embodiments, the color changing chewing gum can have a combination of several water soluble color compounds and/or several water insoluble or oil soluble color compounds. In some embodiments, a color changing chewing gum can comprise a yellow color compound (e.g., beta carotene) with FD&C Blue 1 dye and FD&C Blue 2 dye. In one embodiment, a gum can comprise about 0.004% by weight of a yellow color compound, about 0.014% by weight of FD&C Blue 1 dye, and about 0.24% by weight of FD&C Blue 2 dye. In another embodiment, the color changing chewing gum can comprise a yellow color compound and spirulina.

In certain embodiments, the water soluble color compounds can be selected based on the length of time required for an active ingredient compound to leach into the saliva, such as 1 minute, 5 minutes, 10 minutes, or 20 minutes. In some embodiments, the active ingredient leaches out of the chewing gum in equal or fewer minutes as at least one water soluble color compound leaches out of the chewing gum. In certain non-limiting embodiments, the total time for a visual color or shade change and active ingredient delivery is at least about 5 minutes, at least about 10 minutes, at least about 15 minutes, or at least about 20 minutes.

The total time for the color or shade change can be the same time required for a dental active, e.g., xylitol, to effectively be delivered to the oral cavity.

In certain embodiments, the color compounds can be selected to change the chewing gum color or shade based on the length of time required to increase oral hygiene. An increase in oral hygiene can include, but is not limited to, removing food debris, neutralizing and washing away the acids that are produced when food is broken down by the bacteria within dental plaque, strengthening and remineralizing tooth enamel, and/or reducing oral dryness. In certain embodiments, the color indicating chew gum changes color or shade over a length of time effective to increase salivary flow. In certain embodiments, the color compounds can be selected to change color or shade over an amount of time effective to decrease tooth decay.

In certain embodiments, the color indicating chewing gum changes color over about 20 minutes of chewing. In other embodiments, the color indicating chewing gum can exhibit at least a 1% color change after about 5 minutes of chewing. In certain embodiments, the color indicating chewing gum can exhibit at least a 5% color change after about 10 minutes of chewing.

In certain embodiments, the color compounds can be selected to change the chewing gum color or shade over an amount of time effective to increase cognitive performance. In certain embodiments, an increase in cognitive performance can include, but is not limited to, enhancing mood, concentration, memory, and/or alertness.

In certain embodiments, the presently disclosed subject matter can be administered to a mammal in amounts effective to increase oral hygiene, increase salivary flow, deliver an active ingredient, and/or increase cognitive performance. In certain embodiments, the color indicating chewing gum can be administered one, two, three, or more times per day to achieve these benefits.

In certain embodiments, the presently disclosed subject matter can provide for a kit comprising one or more pieces of color indicating chewing gum. In certain embodiments, each chewing gum is provided for separate administration over a specific course of time, for example, per day, per week, or per month, to effectively increase oral hygiene, increase salivary flow, deliver an active ingredient, and/or increase cognitive performance.

EXAMPLES

The presently disclosed subject matter will be better understood by reference to the following Examples, which are provided as exemplary of the disclosed subject matter, and not by way of limitation.

Example 1: Water Soluble Color Compounds

In this Example, the percent color change of an unchewed gum as compared to a chewed gum was measured using various water soluble color compounds.

A. Methods

FD&C Blue 1 dye, FD&C Blue 2 dye, and caramel liquid color were individually incorporated into a chewing gum formulation. Three levels of each dye were tested: low color level, medium color level, and high color level as summarized in Table 1.

TABLE 1

Levels of dyes tested

|  | Low Level (%) | Medium Level (%) | High Level (%) |
|---|---|---|---|
| FD&C Blue 1 dye | 0.0012 | 0.066 | 0.2 |
| FD&C Blue 2 dye | 0.003 | 0.05 | 0.1 |
| caramel liquid color | 0.3 | 1.0 | 5.0 |

Chewing gum of each level was chewed by 5 subjects. Each cud was measured for lightness (L*) using a Minolta Spectrophotometer at T = 0 minutes, 1 minute, 5 minutes, 10 minutes, and 20 minutes of chewing. L* was calculated using a L*a*b* color space, a color-opponent space with dimension L for lightness. L* was evaluated from 0-100 where 0 was the darkest black and 100 was the brightest white.

B. Results

The polyol present in the gum base provided opacity to unchewed gums, resulting in a higher L* value. Once the gum was chewed, the polyol was solubilized, reducing opacity and therefore reducing the L* value. This is seen in FIG. 1 at 1 minute. Even though the chewing gum centers appeared not to have color, the gum center also changed color and became whiter over time. This was due to the inherent color provided by the gum base and additional ingredients.

Figure 1B:
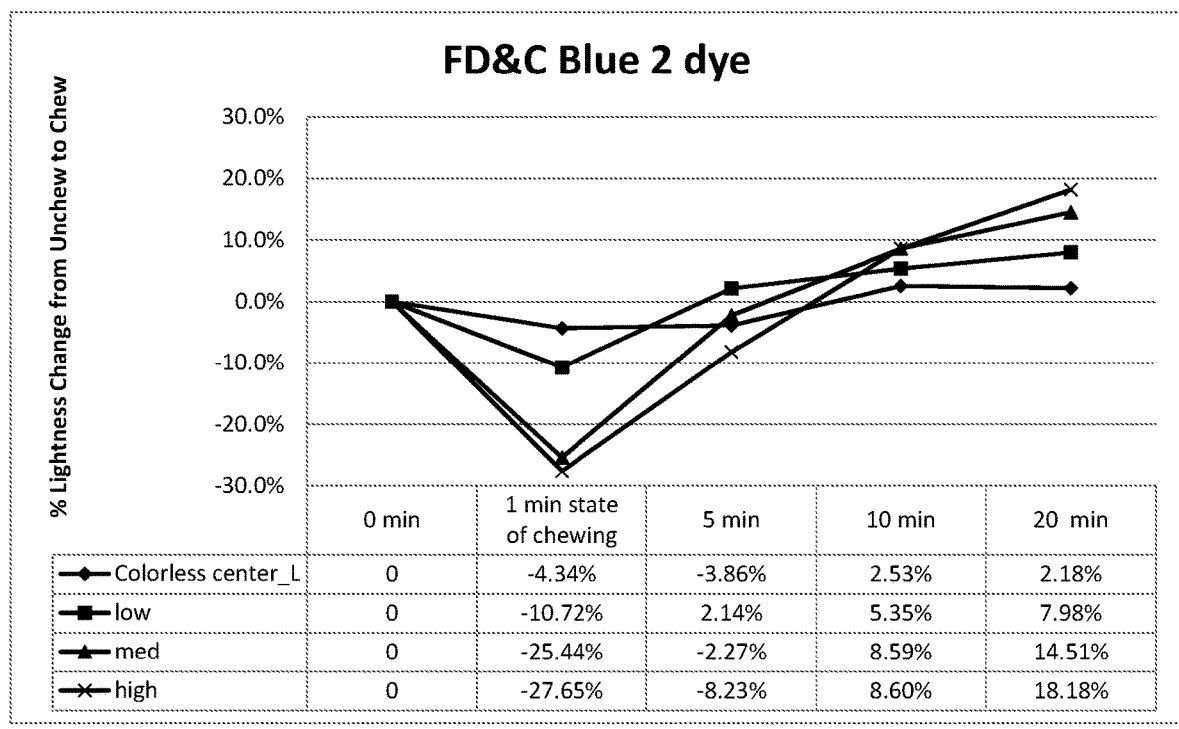
Figure 1C:
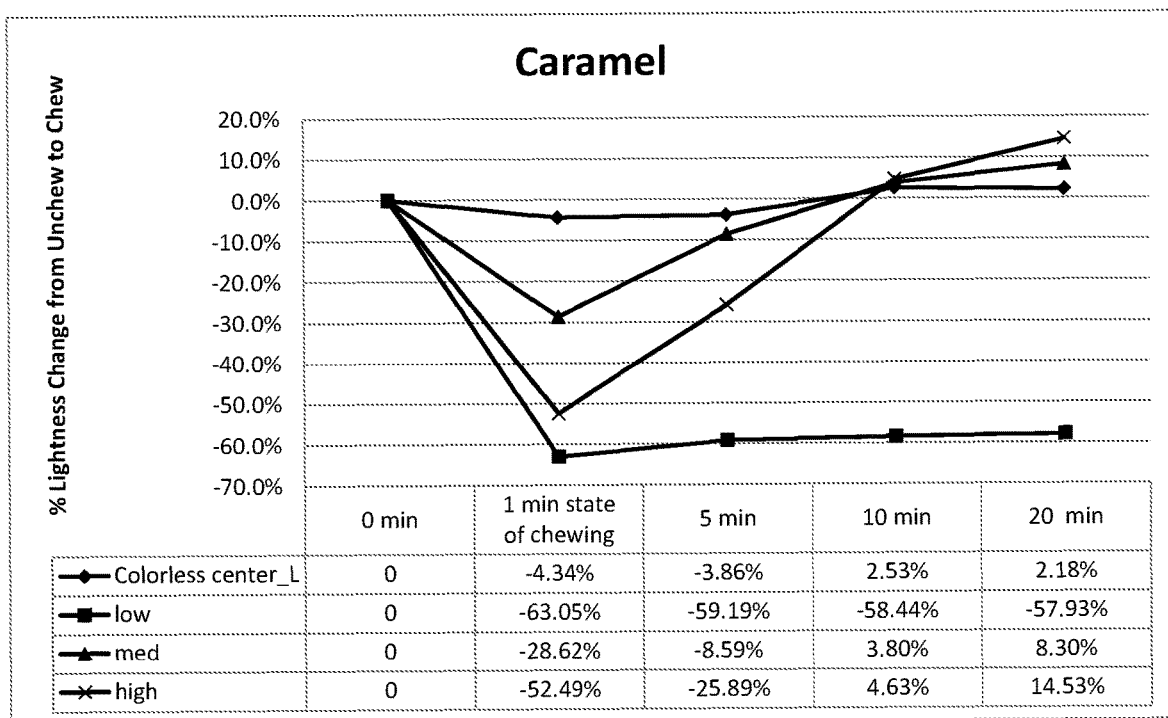

The results for each color compound are summarized in FIGS. 1a-1c. FD&C Blue 1 dye demonstrated a cyan blue shade in the gum matrix, unchewed, as it was added from a pre-solubilized solution. FD&C Blue 2 dye demonstrated a flag blue/blue-red shade for the same reasons.

Example 2: Water Insoluble Color Compounds

In this Example, the percent color change of an unchewed gum as compared to a chewed gum was measured using various water insoluble or oil soluble color compounds.

A. Methods

FD&C Blue 1 lake and beta carotene were incorporated into a chewing gum formulation. The beta carotene was added at three different levels: 0.0006% ("low color level"), 0.004% ("medium color level"), and 0.03% ("high color level") by weight. FD&C Blue 1 lake was present at about 0.02% by weight. The gums were tested using the same procedure as Example 1.

B. Results

Figure 2A:
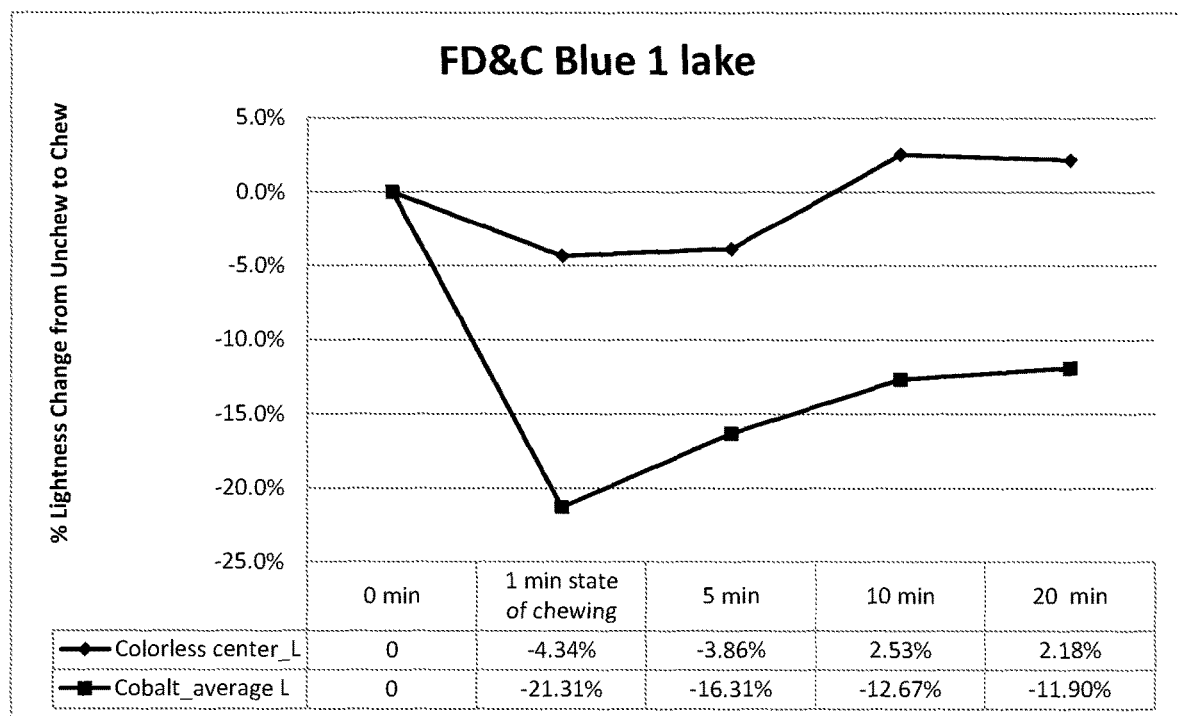
FIGS. 2a-2b display the change in lightness (y-axis) of a chewing gum over time (x-axis). Each chewing gum contained a different water insoluble or oil soluble color compound and was evaluated at T=0 minutes, 1 minute, 5 minutes, 10 minutes, and 20 minutes of chewing.
Figure 2B:
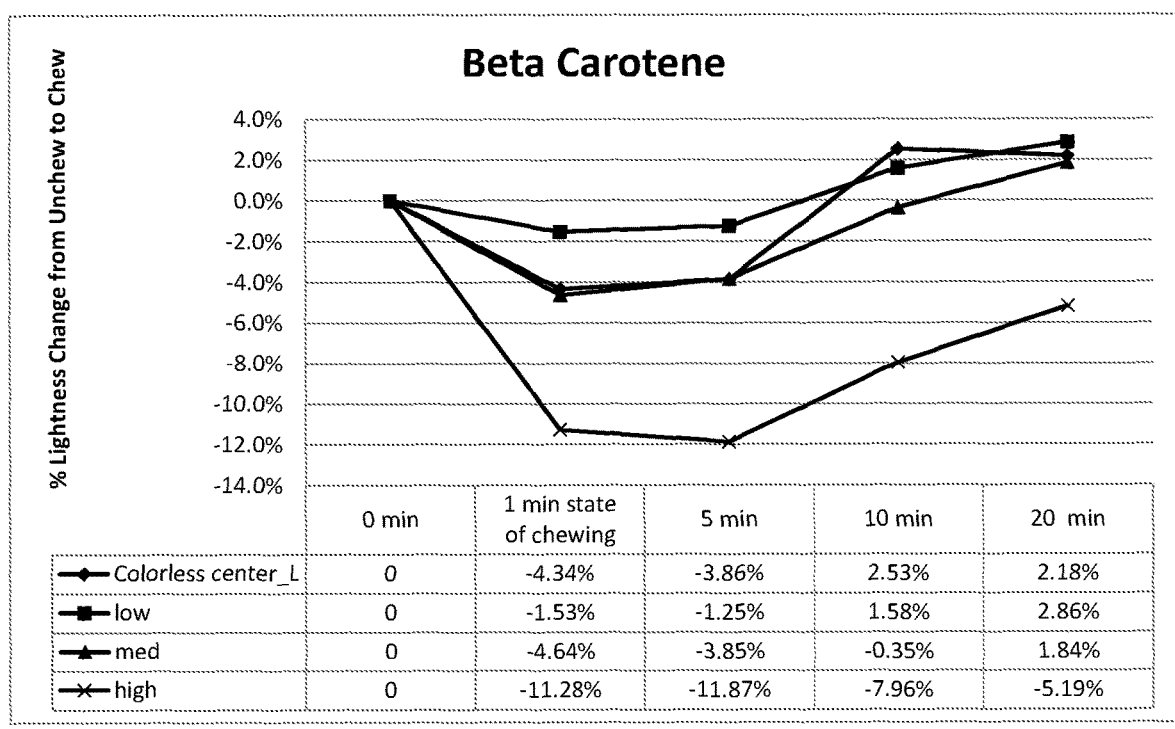

The results for each color compound are summarized in FIGS. 2a-2b. Beta carotene had an affinity for the hydrophobic gum matrix and stayed within the gum cud during chewing.

Example 3: Green to Yellow Color Indicating Gum

In this Example, chewing gum was formulated and visually changed from green to yellow in color upon chewing.

A. Methods

FD&C Blue 1 dye and beta carotene were jointly incorporated into one chewing gum formulation which appeared green in color. The gums were tested using the same procedure as Example 1

B. Results

Figure 3:
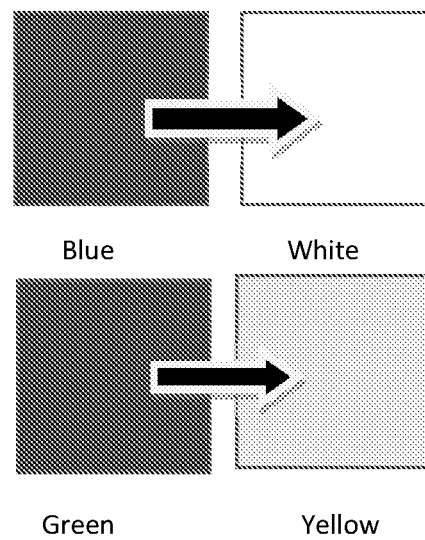
FIG. 3 illustrates the change of color in chewing gum from green to yellow and blue to white after 20 minutes of chewing.

The color change results are illustrated in FIG. 3. Over the course of 20 minutes of chewing, the FD&C Blue 1 dye leached into the saliva. This changed the color of the chewing gum from green to yellow over the 20 minute period as the beta carotene remained in the gum or cud.

Although the presently disclosed subject matter and its advantages have been described in detail, it should be understood that various changes, substitutions and alterations can be made herein without departing from the spirit and scope of the disclosed subject matter as defined by the appended claims. Moreover, the scope of the present disclosure is not intended to be limited to the particular embodiments of the process, machine, manufacture, composition of matter, means, methods and steps described in the specification. As one of ordinary skill in the art will readily appreciate from the disclosure of the presently disclosed subject matter, processes, machines, manufacture, compositions of matter, means, methods, or steps, presently existing or later to be developed that perform substantially the same function or achieve substantially the same result as the corresponding embodiments described herein can be utilized according to the presently disclosed subject matter. Accordingly, the appended claims are intended to include within their scope such processes, machines, manufacture, compositions of matter, means, methods, or steps.

Patents, patent applications publications product descriptions, and protocols are cited throughout this application the disclosures of which are incorporated herein by reference in their entireties for all purposes.

What is claimed is:

1. A chewing gum composition comprising:
   a water insoluble gum base;
   at least one water soluble color compound selected from the group consisting of FD&C Blue 1 dye, FD&C Blue 2 dye, liquid caramel, FD&C Red 40, FD&C Red 3, FD&C Yellow 5, FD&C Yellow 6, FD&C Green 3, betanin, and combinations thereof; and
   at least one water insoluble color compound incorporated into the water insoluble gum base, wherein the at least one water insoluble color compound is selected from the group consisting of lake pigment, curcumin, iron oxides, FD&C Blue 1 lake, beta carotene, Beta Apo 8' Carotenal, canthaxanthin, and combinations thereof;
   wherein the at least one water soluble color compound leaches out of the chewing gum into the saliva after from about 5 minutes to about 20 minutes of chewing to change the visual color of the gum to a color of the at least one water insoluble color compound, and
   wherein the at least one water insoluble color compound stays within the chewing gum base during chewing.

2. The chewing gum composition of claim 1, further comprising an active ingredient.

3. The chewing gum composition of claim 2, wherein the active ingredient is a dental active agent.

4. The chewing gum composition of claim 3, wherein the dental active agent is selected from the group consisting of sodium tripolyphosphate, sodium pyrophosphate (SPP), sodium hexametaphosphate, sodium bicarbonate, urea, lauroyl arginine ethyl ether (LAE), allyl isothiocyanate, zinc lactate, zinc gluconate, tea polyphenols, pigallocatechin gallate (EGCG), cranberry extract, cocoa flavonoids, magnolia bark extract, and combinations thereof.

5. The chewing gum composition of claim 2, wherein the active ingredient leaches out of the chewing gum in equal or fewer minutes as the at least one water soluble color compound leaches out of the chewing gum.

6. The chewing gum composition of claim 1, wherein at least about 1% color change occurs after about 5 minutes of chewing.

7. The chewing gum composition of claim 1, wherein at least about 5% color change occurs after about 10 minutes of chewing.

8. A chewing gum composition comprising:

a water insoluble gum base;

at least one water soluble color compound selected from the group consisting of FD&C Blue 1 dye, FD&C Blue 2 dye, liquid caramel, FD&C Red 40, FD&C Red 3, FD&C Yellow 5, FD&C Yellow 6, FD&C Green 3, betanin, and combinations thereof; and at least one water insoluble color compound incorporated into the water insoluble gum base, wherein the at least one water insoluble color compound is selected from the group consisting of lake pigment, curcumin, iron oxides, FD&C Blue 1 lake, beta carotene, Beta Apo 8' Carotenal, canthaxanthin, and combinations thereof;

wherein the at least one water soluble color compound leaches out of the chewing gum into the saliva after from about 5 minutes to about 20 minutes of chewing to change the visual color of the gum from a combined visual color of the at least one water soluble color compound and the at least one water insoluble color compound to a visual color of only the at least one water insoluble compound, and wherein the at least one water insoluble color compound stays within the chewing gum base during chewing.

9. The chewing gum composition of claim 8, further comprising an active ingredient.

10. The chewing gum composition of claim 9, wherein the active ingredient is a dental active agent.

11. The chewing gum composition of claim 10, wherein the dental active agent is selected from the group consisting of sodium tripolyphosphate, sodium pyrophosphate (SPP), sodium hexametaphosphate, sodium bicarbonate, urea, lauroyl arginine ethyl ether (LAE), allyl isothiocyanate, zinc lactate, zinc gluconate, tea polyphenols, pigallocatechin gallate (EGCG), cranberry extract, cocoa flavonoids, magnolia bark extract, and combinations thereof.

12. The chewing gum composition of claim 9, wherein the active ingredient leaches out of the chewing gum in equal or fewer minutes as the at least one water soluble color compound leaches out of the chewing gum.

13. The chewing gum composition of claim 8, wherein at least about 1% color change occurs after about 5 minutes of chewing.

14. The chewing gum composition of claim 8, wherein at least about 5% color change occurs after about 10 minutes of chewing.

* * * * *